(12) United States Patent
Kettunen (10) Patent No.: US 11,130,687 B2
(45) Date of Patent: Sep. 28, 2021

(54) COAGULANT COMPOSITION FOR WASTEWATER TREATMENT

(71) Applicant: KEMIRA OYJ, Helsinki (FI)

(72) Inventor: Vesa Kettunen, Kempele (FI)

(73) Assignee: KEMIRA OYJ, Helsinki (FI)

( * ) Notice: Subject to any disclaimer, the term of this patent is extended or adjusted under 35 U.S.C. 154(b) by 306 days.

(21) Appl. No.: 16/303,506

(22) PCT Filed: May 24, 2017

(86) PCT No.: PCT/EP2017/062632
§ 371 (c)(1),
(2) Date: Nov. 20, 2018

(87) PCT Pub. No.: WO2017/202969
PCT Pub. Date: Nov. 30, 2017

(65) Prior Publication Data
US 2020/0299157 A1   Sep. 24, 2020

(30) Foreign Application Priority Data
May 25, 2016 (SE) .................................. 1650721-2

(51) Int. Cl.
*C02F 1/52* (2006.01)
*C02F 3/30* (2006.01)
(Continued)

(52) U.S. Cl.
CPC ............ *C02F 1/5245* (2013.01); *C02F 3/305* (2013.01); *C02F 3/308* (2013.01); *C02F 1/686* (2013.01);
(Continued)

(58) Field of Classification Search
CPC ........ C02F 1/5245; C02F 3/305; C02F 3/308; C02F 2305/06; C02F 3/306; C02F 1/686; C02F 2101/105; C02F 2101/16
(Continued)

(56) References Cited

U.S. PATENT DOCUMENTS 8,021,556 B2 * 9/2011 Davis ........................ C02F 9/00
210/666
2008/0169245 A1 * 7/2008 Roa-Espinosa ....... C02F 1/5245
210/734
(Continued)

FOREIGN PATENT DOCUMENTS

CN      104907047 A    9/2015
EP        0882675 A1   12/1998
(Continued)

OTHER PUBLICATIONS

Sweden Patent Office Action dated Dec. 2, 2016 for 1650721-2.
International Search Report dated Jul. 24, 2017 for PCT Application No. PCT/EP2017/062632.

*Primary Examiner* — Fred Prince
(74) *Attorney, Agent, or Firm* — Moser Taboada (57) ABSTRACT

The present invention relates to a coagulant composition comprising a coagulant and a carbon source compound, wherein the coagulant is selected from the group iron and aluminium salts, or any combination thereof. The carbon source includes methanol, ethanol or glycol. The present invention further relates to a method of treating wastewater, e.g. containing nitrogen and/or phosphate, including providing the coagulant composition to wastewater before, during and/or after a biological treatment step, and the use of the coagulant composition in wastewater treatment.

15 Claims, 2 Drawing Sheets

(51) Int. Cl.
  *C02F 1/68* (2006.01)
  *C02F 101/10* (2006.01)
  *C02F 101/16* (2006.01)

(52) U.S. Cl.
  CPC .... *C02F 2101/105* (2013.01); *C02F 2101/16* (2013.01); *C02F 2305/06* (2013.01)

(58) Field of Classification Search
  USPC .................. 210/631, 723, 903, 906, 610
  See application file for complete search history.

(56) References Cited

U.S. PATENT DOCUMENTS

| | | |
|---|---|---|
| 2010/0025326 A1 | 2/2010 | Gallagher et al. |
| 2010/0163484 A1 | 7/2010 | Cormier et al. |
| 2013/0180924 A1* | 7/2013 | Macpherson, Jr. ....... C02F 9/00 210/669 |

FOREIGN PATENT DOCUMENTS

| | | |
|---|---|---|
| EP | 1013613 A1 | 6/2000 |
| WO | WO-2007131197 A2 | 11/2007 |
| WO | WO-2012019310 A1 | 2/2012 |

* cited by examiner

COAGULANT COMPOSITION FOR WASTEWATER TREATMENT

FIELD OF THE INVENTION

The present invention relates to a coagulant composition and method of removing nutrients from wastewaters.

BACKGROUND

In recent years different authorities around the world have issued regulations regarding demanding a decrease of the amount of certain nutrients, particularly phosphorus and nitrogen, that can be discharged from wastewater treatment facilities into streams, lakes, potable water systems etc.

In order to efficiently remove nitrogen, many wastewater treatment facilities have been designed to remove nutrients, nitrogen and phosphorus, biologically.

All the biological nitrogen removing systems are based on a combination of nitrification and denitrification processes. During nitrification, ammonia is oxidized to nitrate and nitrites. During denitrification the nitrates and the nitrites are converted using chemical additives to the molecular nitrogen which is then released to the atmosphere.

Nitrogen removal typically involves a system having an anoxic treatment zone and an oxic zone with an internal recycle of nitrified mixed liquor (containing nitrate) from the oxic treatment zone back to the preceding anoxic treatment zone. A system may comprise a sequence of anoxic and oxic treatment zones in series or parallel. A problem may arise because the nitrified mixed liquor recycled from the oxic zone to the preceding anoxic zone contains a significant dissolved oxygen concentration. The dissolved oxygen recycled back to the anoxic zone oxidizes a significant portion of the incoming soluble BOD and thus reduces the BOD available for denitrification. This has a harmful and detrimental effect on the denitrification process carried out in the anoxic zone.

EP1013613 discloses a biological treatment of phosphate-containing wastewater.

Presently known processes that uses methanol in the denitrification process have disadvantages relating to safety issues of the methanol handling. At present wastewater treatment plant use a separate methanol dosing. However, methanol is toxic, flammable and requires EX protected equipments for both storage and dosing. Thus, the present handling with methanol in wastewater treatment plants presents high cost equipments and working environment safety issues.

Therefore, there is a need for improved nutrient removal compounds and process in wastewater treatments not having the same drawbacks as present products and processes.

SUMMARY OF THE INVENTION

The present invention provides a multi-performance product for use in wastewater treatment. The coagulant composition according to the present invention provides for better handling safety and improves the working environment at the wastewater treatment plants as well as allows for non-EX classified equipment to be used for the wastewater treatment. The possibility to use such equipment allows for lower investments costs both for production and storage facilities. In addition lower costs of operation may be obtained as e.g. easier maintenance, fewer employees, less storage space, easier handling, etc, influences.

When the coagulant composition is provided to wastewaters it is able to simultaneously provide additional water soluble carbon source to the wastewater and remove water-soluble phosphorus, and total organic carbon (TOC) from the wastewater. Thus the present coagulant composition is a multi-performance product.

One aspect of the present invention is to provide a coagulant composition comprising a coagulant and a carbon source compound, wherein the coagulant is selected from the group of iron, and aluminium salts, or any combination thereof, preferably selected from the group ferric, ferrous and, aluminium (III) salts, or any combination thereof.

Another aspect is to provide a method of treating wastewater including providing the coagulant composition to wastewater before, during and/or after a biological (nitrogen removal) treatment step (of a wastewater treatment plant).

Yet another aspect is the use of the coagulant composition in wastewater treatment, e.g. being added in the primary, secondary and/or tertiary treatment stages of a wastewater treatment plant.

DETAILED DESCRIPTION

One object of the present invention is to provide a coagulant composition comprising a coagulant and a carbon source compound. The present coagulant composition may be called a carbon source coagulant composition. The present coagulant composition is a stable blend product. It is not always easy to obtain stable products, also over time, i.e. storage stable, when different components are combined.

The coagulant in the coagulant composition used may be selected from at least one of iron and aluminium salts, and any combination thereof. In some embodiments, it may be selected from salts of magnesium, zinc, zirconium, titanium, silicon, or the like. The inorganic coagulant may be salts of the above metals, and may be chosen from chlorides, sulphates, hydroxides, oxides, and nitrates, and any combination thereof. Examples of such compounds are aluminium sulphate, aluminium chloride, polyaluminium chloride, polyaluminium sulphate, polyaluminium nitrate, aluminium chlorohydrate, ferric chloride, ferric sulphate, ferric chlorosulphate, ferrous chloride, ferrous sulphate, ferrous chlorosulphate, ferric hydroxide, ferrous hydroxide, magnesium oxide, magnesium hydroxide, and magnesium chloride, and may also be used in any combination thereof.

The coagulant is preferably selected from the group iron (II), iron (III) and aluminium (III) salts, or any combination thereof.

The iron salt of the coagulant may be selected from anyone of sulphates, chlorides and formiates, and any combination thereof. More specifically the iron salts may be ferrous or ferric salts, e.g. selected from the group ferrous sulphate, ferrous chloride, ferrous sulphate-chloride, ferrous formiate, ferric sulphate, ferric chloride, ferric sulphate-chloride and ferric formiate, and any combination thereof. Examples of preferred iron salts are ferric sulphate and/or ferric chloride.

The aluminium salt of the coagulant may be selected from anyone of sulphates, chlorides, silicates, formiate, chlorohydrate and aluminate, and any combination thereof. More specific examples of the aluminium salt may be selected from aluminium sulphate, polyaluminium sulphate, aluminium sulphate chloride, aluminium chloride, polyaluminium chloride, polyaluminiumchloride sulphate, polyaluminiumchloride silicate, aluminium formiate, polyaluminium formiate, aluminium chlorohydrate, and sodium aluminate, and any combination thereof. Examples of preferred aluminium salts are sodium aluminate, polyaluminium chloride(s) and/or aluminium sulphate.

In addition to the coagulant the present coagulant composition comprises a carbon source compound. The carbon source compound may be selected form the group alcohols, fatty acids, sugars, molasses, and acetates, and any combination thereof.

If the carbon source selected is an alcohol, it may be selected from short chain alcohols. Short chain alcohol is herein interpreted as alcohols having 1-5 carbon atoms. Preferably 1-3 carbon atoms are present in the short chain alcohols. The alcohols may have one or more hydroxy groups. The alcohols preferably have at least two hydroxy groups. Thus, polyols may be used, e.g. diols or triols. For example, 1-3 hydroxy groups are included in the alcohols. Each carbon atom may have one hydroxy group connected to it. Examples of preferred alcohols preferably selected from the group methanol, ethanol, propanol, ethylene glycol, and glycerol, and any combination thereof. Preferably the alcohols are chosen from alcohols which are not flammable nor dangerous, as that improves safety conditions and allows for other types of processing equipments to be used.

If the carbon source selected is a fatty acid, it may be selected from short chain fatty acids. Short chain fatty acid is herein interpreted as fatty acids having 1-5 carbon atoms. Preferably 1-3 carbon atoms are present in the short chain fatty acids, such as 1-2 carbon atoms. Examples of preferred fatty acids are formic acid, acetic acid, and propionic acid, and any combination thereof.

If the carbon source selected is a sugar, it may be selected from monosaccharides and/or oligosaccharides. Sugars used herein is preferably short-chain, soluble carbohydrates. Monosaccharides may selected from glucose, fructose, and glyceraldehyde, and any combination thereof. Oligosaccharides may be selected from disaccharides and trisaccharides. Disaccharides may be selected from saccharose (sucrose), lactose and maltose, and any combination thereof.

If the carbon source selected is molasses, it may be produced from e.g. sugar cane, sugar beets, sweet sorghum, carob, grapes, dates, pomegranates, and mulberries.

If the carbon source selected is an acetate, it may be selected from short chain acetates. Short chain acetates are herein interpreted as acetates having 2-6 carbon atoms. Preferably 2-4 carbon atoms are present in the short chain acetates. The acetates may be acetate esters, e.g. selected from methyl acetate, ethyl acetate, isopropyl acetate, and vinyl acetate.

The carbon source compound may be present in the coagulant composition in an amount of 0.5-50 wt %, e.g. 1-50 wt %, 5-50 wt %, 10-50 wt %, 1-30 wt %, 5-30 wt %, 10-30 wt %, 1-20 wt %, 2-20 wt %, 5-20 wt %, 10-20 wt %, or 5-10 wt %.

The coagulant composition may contain only coagulant and carbon source compound, or include additional additives.

The coagulant composition provided is obtained in liquid form and is storage stable. No precipitation occurs in the coagulant composition after preparation and the solution is clear. The coagulant composition may be storage stable for at least one month, such as at least two months, at least three months, or at least four months. The storage stability may be provided for room temperature, heated to 40° C. and cooled to 2° C. The coagulant composition is stable and thus avoids or limits phase separation and precipitation.

The coagulant composition is providing not only effective coagulants but also a carbons source compound to allow improved total nitrogen removal. If wastewater treatments are run with too low carbon content the total nitrogen removal is not very efficient.

The coagulant composition may be obtained by the method of providing a coagulant and a carbon source compound, and mixing said coagulant with the carbon source to obtain said coagulant composition. The mixing of coagulant and carbon source before any addition to e.g. wastewater is important as it provides easier handling and better working environment.

The present invention further relates to a process removing nutrients (e.g. phosphorous, P, and nitrogen, N) from wastewater. An object of the present invention is to provide a method of treating wastewater including providing said coagulant composition to wastewater before, during and/or after a biological nitrogen removal treatment step. Another way of describing the present process is that it is a method of treating wastewater including providing said coagulant composition to wastewater before and/or at a primary settling step; added before and/or at a biological treatment step; or before and/or at a filtration step following the biological treatment step; and in addition any combination thereof could be also be used. In one embodiment there is provided a method of treating wastewater including providing said coagulant composition to wastewater before and/or at a primary settling step; added before and/or at a secondary treatment step; or before and/or at a tertiary treatment step; and in addition any combination thereof could also be used.

A wastewater treatment may comprise different treatment steps for addition and removal of different components. In a wastewater treatment plant a nitrogen removal step may be included, which is a part of a secondary treatment of wastewater. The secondary treatment step involves a biological treatment. Precipitation and/or sedimentation may be post-treatments of the secondary treatment. Primary treatment of sludge normally relates to settling, sedimentation and clarifying, which step is preceding the secondary treatment. A tertiary treatment step may further be used in order to remove even more components found in the water. Examples of tertiary treatment steps may be selected from sand filtration, biological filtration, and flotation.

During nitrogen removal the wastewater may be subjected to two different steps, nitrification and denitrification. These steps may be performed sequentially in any order and may also be performed multiple times. A denitrification may be followed by a nitrification step, which in turn optionally may be followed by a denitrification step, which also optionally may be followed by a nitrification step. The nitrification and denitrification steps may be performed in different containers, e.g. (bio)reactors or basins, or may be performed in the same container but within different sections of said container. As the nitrification and denitrification steps have different requirements these must be met by the equipment provided. If an aeration basin is used for the nitrification there may be non-aerated zones in said basin, wherein denitrification may occur. Denitrification occurs under anoxic conditions, i.e. oxygen depleted conditions. The denitrification must be mixed well in order to achieve the desired denitrification e.g. by using submersible mixers. The denitrification step may include a mixture of recirculated mixed liquor of the nitrogen removal step, recirculated activated sludge obtained after the biological treatment (e.g. from a settling step), and raw influent (inlet wastewater nitrogen removal step), and optional addition of the present coagulant composition.

The present coagulant composition may be added to the wastewater in connection to the nitrogen removal treatment, which involves biological treatment. The nitrogen removal treatment may include an inlet of wastewater, a primary settling (a pre-sedimentation step), a biological treatment using nitrification and denitrification, a secondary settling (a post-sedimentation step) and a filtration step. Precipitation can be induced during wastewater treatment in different stages, e.g. during the nitrogen removal treatment.

In pre-precipitation, the present coagulant composition is added before and/or at a primary settling stage and then undergoes a subsequent biological treatment. In simultaneous precipitation, the present coagulant composition is added before and/or in the biological treatment stage. Therefore, biological and chemical treatment occurs at the same stage. In post-precipitation, the present coagulant composition is added after the biological treatment, e.g. just before and/or in a following filtration step. The following filtration step may be included in the tertiary treatment of the wastewater.

The present coagulation composition may be added in pre-precipitation, simultaneous precipitation and post-precipitation steps.

The coagulant composition may be added to the wastewater in non-aerated zones of the nitrogen removal process of the wastewater treatment. The reaction occurring is conversion of nitrate to nitrogen gas.

The coagulant composition may be added in a predenitrification stage of the biological treatment. The predenitrification stage may be preceding a nitrification stage. Addition to a predenitrification stage may be done at the first denitrification stage of the process preceding any nitrification step. and/or a subsequent denitrification stage. The predenitrification stage may be a non-aerated zone e.g. of an aeration basin where the biological treatment occurs. In the aeration basin also nitrification occurs in aerated zones along with further denitrification.

The coagulant composition may be added in the biological treatment step at the denitrification step. In addition if multiple denitrification and nitrification zones are involved the coagulant composition may be added in anyone of the denitrification zones.

The coagulant composition may be added in a post-denitrification stage of the nitrogen removal process of the wastewater treatment. Such may be at and/or before the filtration performed after the biological treatment. The post-denitrification is performed in a non-aerated zone, e.g. a bio filter. For additional nitrogen removal at this stage the coagulant composition is needed.

A combination of pre-denitrification and post-denitrification may be done. The present nitrogen removal process is very efficient and a total nitrogen removal of over 90% is obtainable.

The coagulant composition is added at non-aerated zone. The composition reacts with the wastewaters in a denitrification step. There may be performed a recirculation in the wastewater treatment. A portion of the wastewater obtained from the biological treatment step is returned to a denitrification step of said biological treatment.

The present coagulant composition may be used in wastewater treatment. Preferably for removal of water-soluble phosphorus and total organic carbon removal. The coagulant composition is added in the secondary and/or tertiary treatment stages of the wastewater treatment.

The primary treatment of a wastewater plant is designed to remove gross, suspended and floating solids from raw sewage. It includes screening to trap solid objects and sedimentation by gravity to remove suspended solids. This level is sometimes referred to as "mechanical treatment", although chemicals are often used to accelerate the sedimentation process. The subsequent secondary treatment includes the biological treatment and removes dissolved organic matter, phosphorus and nitrogen that escape the primary treatment. This is achieved by microbes consuming the organic matter, and converting it to carbon dioxide, water, and energy for their own growth and reproduction. The secondary treatment may require a separation process ("secondary or post-sedimentation") to remove the microorganisms and more of the suspended solids from the treated water prior to discharge to the tertiary treatment. The tertiary treatment is sometimes defined as anything more than primary and secondary treatment in order to allow rejection into a highly sensitive or fragile ecosystem (estuaries, low-flow rivers, coral reefs, etc). An example of a typical tertiary treatment process is the modification of a conventional secondary treatment plant to remove additional phosphorus and/or nitrogen.

According to the present invention the coagulant composition may be used for water soluble phosphorus and total nitrogen removal from wastewater.

EXAMPLES

Materials

Coagulant compositions were prepared and their stability tested. The coagulant compositions comprised mixtures of carbon sources, water and iron or aluminium salts. The carbon sources used in the tests were alcohols of 99.9%, and chosen from methanol, ethanol and glycol. In the tests different concentrations of metal was used for the metal salt compositions. The coagulant compositions were prepared by providing a solution of a metal salt. Water and a carbon source were added thereto. The carbon source was added in an amount of 0.5 wt %, 10 wt %, 25 wt % and 50 wt %. The mixture of carbon source, water and metal salt was mixed for about 10 min. The stability of the mixtures was evaluated immediately at room temperature (about 22° C.) and also over a time period of 17 days. Below and in table 1 the tested compositions are presented.

Stability Tests

Compositions no 1-9 related to compositions of ferric sulphate and methanol. The compositions were clear and brown/reddish solutions immediately after preparation.

Compositions no 10-18 related to compositions of ferric sulphate and ethanol. The compositions were clear and brown/reddish solutions immediately after preparation.

Compositions no 19-27 related to compositions of ferric sulphate and glycol. The compositions were clear and brown/reddish solutions immediately after preparation.

Compositions no 28-36 related to compositions of ferric chloride and methanol. The compositions were clear and brown/reddish solutions immediately after preparation.

Compositions no 37-45 related to compositions of poly-aluminium chloride and methanol. The compositions were clear and colourless/light yellow solutions immediately after preparation.

Compositions no 46-54 related to compositions of polyaluminium chloride and ethanol. The compositions were clear and colourless/light yellow solutions immediately after preparation.

Compositions no 55-63 related to compositions of polyaluminium sulphate and methanol. The compositions were clear and colourless solutions immediately after preparation.

Compositions no 64-72 related to compositions of sodium aluminate and methanol. The compositions were clear and colourless/brownish solutions immediately after preparation.

All products were stable and no precipitation was detected during 17 days storing.

TABLE 1

| | Concentration in total | | | | |
|---|---|---|---|---|---|
| Test No | $Fe^{3+}$ (wt %) | $Al^{3+}$ (wt %) | MeOH (wt %) | EtOH (wt %) | Glycol (wt %) |
| 1 | 12.4 | | 0.5 | | |
| 2 | 9.4 | | 25.0 | | |
| 3 | 6.3 | | 50.0 | | |
| 4 | 10.0 | | 0.5 | | |
| 5 | 7.5 | | 25.0 | | |
| 6 | 5.0 | | 50.0 | | |
| 7 | 4.0 | | 0.5 | | |
| 8 | 3.0 | | 25.0 | | |
| 9 | 2.0 | | 50.0 | | |
| 10 | 12.4 | | | 0.5 | |
| 11 | 9.4 | | | 25.0 | |
| 12 | 6.3 | | | 50.0 | |
| 13 | 10.0 | | | 0.5 | |
| 14 | 7.5 | | | 25.0 | |
| 15 | 5.0 | | | 50.0 | |
| 16 | 4.0 | | | 0.5 | |
| 17 | 3.0 | | | 25.0 | |
| 18 | 2.0 | | | 50.0 | |
| 19 | 12.4 | | | | 0.5 |
| 20 | 9.4 | | | | 25.0 |
| 21 | 6.3 | | | | 50.0 |
| 22 | 10.0 | | | | 0.5 |
| 23 | 7.5 | | | | 25.0 |
| 24 | 5.0 | | | | 50.0 |
| 25 | 4.0 | | | | 0.5 |
| 26 | 3.0 | | | | 25.0 |
| 27 | 2.0 | | | | 50.0 |
| 28 | 13.7 | | 0.5 | | |
| 29 | 10.4 | | 25.0 | | |
| 30 | 6.9 | | 50.0 | | |
| 31 | 10.0 | | 0.5 | | |
| 32 | 7.5 | | 25.0 | | |
| 33 | 5.0 | | 50.0 | | |
| 34 | 4.0 | | 0.5 | | |
| 35 | 3.0 | | 25.0 | | |
| 36 | 2.0 | | 50.0 | | |
| 37 | | 9.2 | 0.5 | | |
| 38 | | 6.9 | 25.0 | | |
| 39 | | 4.6 | 50.0 | | |
| 40 | | 5.0 | 0.5 | | |
| 41 | | 3.8 | 25.0 | | |
| 42 | | 2.5 | 50.0 | | |
| 43 | | 3.0 | 0.5 | | |
| 44 | | 2.3 | 25.0 | | |
| 45 | | 1.5 | 50.0 | | |
| 46 | | 9.2 | | 0.5 | |
| 47 | | 6.9 | | 25.0 | |
| 48 | | 4.6 | | 50.0 | |
| 49 | | 5.0 | | 0.5 | |
| 50 | | 3.8 | | 25.0 | |
| 51 | | 2.5 | | 50.0 | |
| 52 | | 3.0 | | 0.5 | |
| 53 | | 2.3 | | 25.0 | |
| 54 | | 1.5 | | 50.0 | |
| 55 | | 4.0 | 0.5 | | |
| 56 | | 3.0 | 25.0 | | |
| 57 | | 2.0 | 50.0 | | |
| 58 | | 3.0 | 0.5 | | |
| 59 | | 2.3 | 25.0 | | |
| 60 | | 1.5 | 50.0 | | |
| 61 | | 2.0 | 0.5 | | |
| 62 | | 1.5 | 25.0 | | |
| 63 | | 1.0 | 50.0 | | |
| 64 | | 6.8 | 0.5 | | |
| 65 | | 5.2 | 25.0 | | |
| 66 | | 3.4 | 50.0 | | |
| 67 | | 4.7 | 0.5 | | |
| 68 | | 3.6 | 25.0 | | |
| 69 | | 2.4 | 50.0 | | |
| 70 | | 2.6 | 0.5 | | |
| 71 | | 2.0 | 25.0 | | |
| 72 | | 1.3 | 50.0 | | |

Pre-Precipitation Tests

Wastewater obtained from a local municipal wastewater plant was used for the tests performed. In the wastewater treatment plant raw wastewater is subjected to aeration and thereafter a settling/clarifying step (primary sedimentation). In pre-precipitation, chemicals are added before the primary settling and then undergo biological treatment. The wastewater provided for the tests herein was retrieved before the aeration step, when water is forwarded to primary sedimentation basins and then further to the aeration stage. The wastewater that was used in was raw wastewater that was taken from the wastewater treatment process after the mechanical treatment. Mechanical treatment includes a screening and sand separation of the wastewater. Therefore no pre-precipitation chemicals have been added to the wastewater upon retrieval. The amount of the present coagulant composition provided to the provided wastewater was selected from dosages of 100, 200, 300 and 400 g/m$^3$.

The compositions were prepared and tested under the following conditions. The compositions of Table 2 were added to wastewater in a 1 l jar test device. The tests were performed at room temperature (about 25° C.). The wastewaters with added compositions were subjected to fast mixing for about 10 seconds. Thereafter, the mixing speed was decreased and slow mixing continued for 10 min. The mixing conditions are disclosed below in Table 2. Thereafter the mixing was stopped and the samples were allowed to settle. Settling or sedimentation was continued for a time period of 10 min. Samples were taken from the surface of the waters in the jar test device with a pipette and were analyzed. Analyses of the amount of total phosphorous, water soluble phosphorous and total biochemical oxygen demand (BOD) were performed. The BOD was BOD7 indicating the unit milligram oxygen per litre over a 7 day period.

TABLE 2

| Flocculation test conditions Room temperature (25° C.) | | |
|---|---|---|
| | rpm | time |
| Fast mix | 400 | 10 s |
| Slow mix | 50 | 10 min |
| Sedimentation | | 10 min |

In the tests there is included reference tests with no mixing, no sedimentation, addition of different amounts of ferric sulphate (PIX) alone, and addition of different amounts of polyaluminium chloride (PAX) alone; and coagulant compositions according to the present invention including blends of PIX-105 or PAX-XL100, and carbon source, in this case, methanol in different amounts. The PIX and PAX were added in amounts of 0.1, 0.2, 0.3, and 0.4 kg/m$^3$. When prepared as a composition to be added, the coagulant composition additionally contained 10, 15 or 20 wt % methanol when combined with PIX, and 20, 30 or 40 wt % methanol when combined with PAX.

It was found that the total phosphorus concentration and the water soluble phosphorus concentration decreased using the present stable coagulant composition e.g. compared to no addition of chemicals. Also, the present coagulant composition is able to reach about the same efficiency in phosphorous removal compared to standard PIX or PAX by using a slightly higher carbon source dose. Also, the total BOD7 concentration increased in the wastewater after coagulation and sedimentation. An increased total BOD7 means that there is more carbon source in the water. A carbon source is needed for the biological activity in a subsequent nitrogen removal process of wastewater treatment plants (the biological treatment). The coagulant composition and method of using it in wastewater treatment is clearly shown beneficial to a wastewater treatment plant as the amount of phosphorous in the water is decreased and the amount of carbon in the water is increased, which boosts the following degradation processes.

Figure 1:
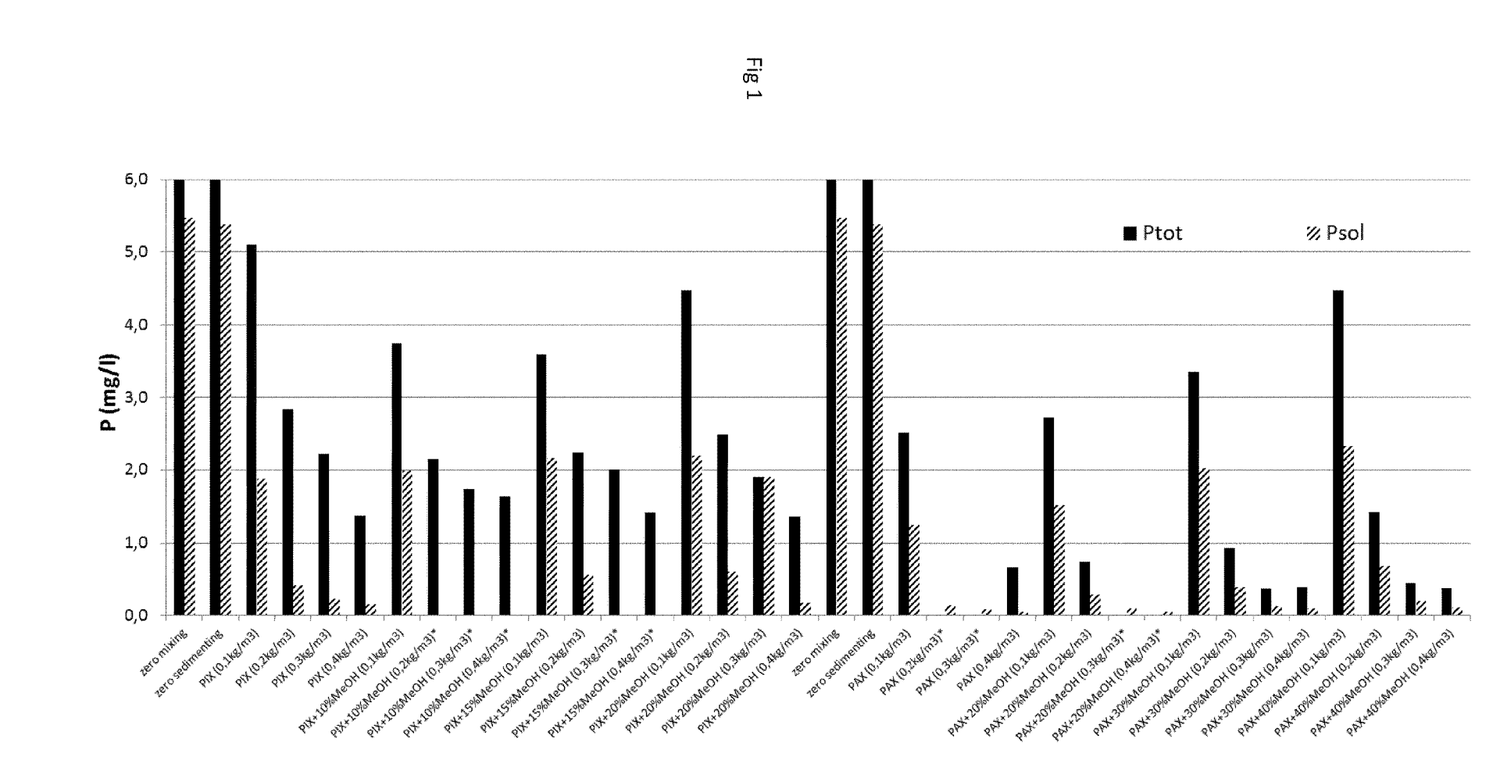
FIG. 1 shows a graph of results for total phosphorous and water soluble phosphorous in pre-precipitation experiments.

In FIG. 1 the amount of phosphorous in the waters is compared. Depending on which additive was used or not used the values for total phosphorous concentration and water soluble phosphorous concentration is different after the treatment. The phosphorus in the wastewaters was removed better with polyaluminium chloride (PAX) and blends with alcohol (doses 100-400 g/m$^3$).

Figure 2:
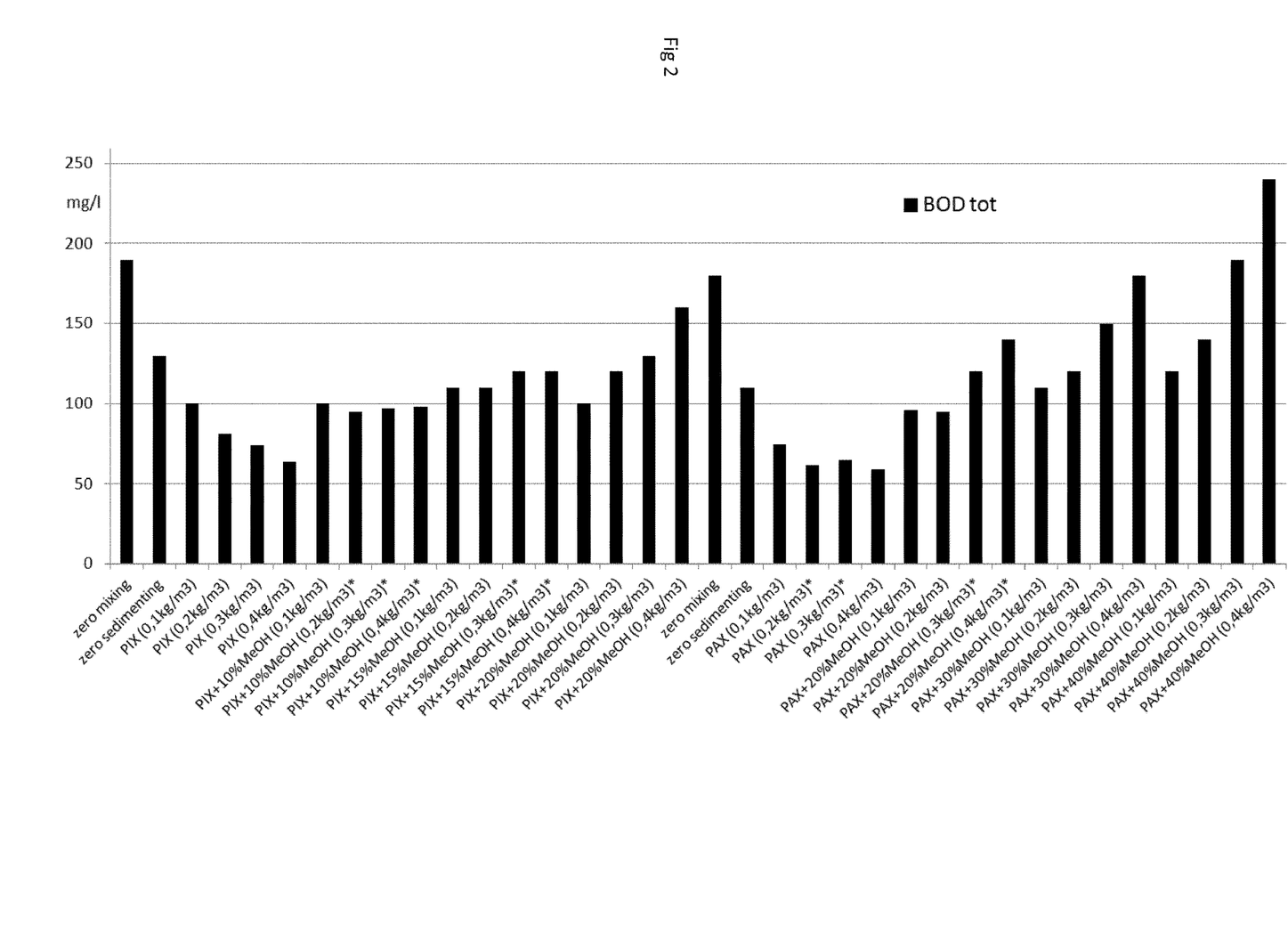
FIG. 2 shows a graph of results for BOD7 in pre-precipitation experiments.

In FIG. 2 discloses the BOD results with PIX-105 and PAX-XL100, and their coagulant compositions, i.e. blends with methanol. The tests included reference tests with no mixing, and PIX and PAX, alone.

Post-Precipitation Tests

A BOD7 increase which can be seen above would also be seen in post-precipitation and in tertiary treatment processes, if the present carbon source coagulants would be used.

Storage Stability Of Raw Glycerol

The storage stability was measured using viscosity measurements and ocular review. Viscosity measurements were made using a Brookfield Viscometer and spindles S64 and S63. An increasing viscosity could be an indication of an unstable composition.

NMR analysis and other analysis results of the raw glycerol samples and reference are collected in the table 3.

TABLE 3

| Sample | Glycerol wt % (average) | Density g/cm$^3$ | Cl mg/kg | SO$_4$ mg/kg |
|---|---|---|---|---|
| Raw glycerol 1 | 81 | 12.5 | 2700 | 3900 |
| Raw glycerol 2 | 77 | 12.9 | 230 | 2200 |
| Glycerol 99.7 wt % | 99 | | | |

Glycerol, and PIX-105 or NaOH Blend Compositions

Blends with PIX-105 and raw glycerol were done with different mass contents of glycerol. The amount of Fe in the coagulant used was 11.7 wt %. The glycerol amount disclosed in the table is in wt % of the blend. In the mixing phase there were not seen any precipitate formation.

Stability testing was first carried out in the room temperature for 3 months and then continued in 2° C. for three months. Stabilities of these blends are collected in the table 4. All blends with glycerol content are stable in temperatures 2-25° C.

Blends with 32/50% NaOH and raw glycerol were done with different mass contents of glycerol. There were only two blends showing a type of stability: NaOH (32%) with 10 and 20% glycerol. These were stable for one month in room temperature.

TABLE 4

| Sample | PIX-105 Fe in blend | Glycerol in blend | Instant RT | 1 month RT | 3 months RT | 1 month 2° C. | 3 months 2° C. |
|---|---|---|---|---|---|---|---|
| B1 | 10% Fe | 10% | Stable | Stable | Stable | Stable | Stable |
| B2 | 9% Fe | 20% | Stable | Stable | Stable | Stable | Stable |
| B3 | 8% Fe | 30% | Stable | Stable | Stable | Stable | Stable |
| B4 | 7% Fe | 40% | Stable | Stable | Stable | Stable | Stable |
| B5 | 6% Fe | 50% | Stable | Stable | Stable | Stable | Stable |

Unfiltrated sample includes some precipitation, which can be seen also in blends.

Stability testing was also carried out in room temperature for 3 months using different iron containing coagulants and different carbon sources to provide the blend. Stabilities of these blends are collected in the table 5. The amount of Fe in the coagulant materials used was 4, 10 or 12.5 wt % before the addition of the carbon source to prepare the blend. The carbon source amount disclosed in the table is in wt % of the blend. All blends with up to 50% carbon source and up to 12.5% initial iron content are stable in room temperature.

TABLE 5

| Sample | Coagulant | Carbon source | Instant RT | 1 month RT | 3 months RT |
|---|---|---|---|---|---|
| C1 | PIX-105 4% Fe | Methanol 0.5% | Stable | Stable | Stable |
| C2 | PIX-105 4% Fe | Methanol 10% | Stable | Stable | Stable |
| C3 | PIX-105 4% Fe | Methanol 25% | Stable | Stable | Stable |
| C4 | PIX-105 4% Fe | Methanol 50% | Stable | Stable | Stable |
| C5 | PIX-105 10% Fe | Methanol 0.5% | Stable | Stable | Stable |
| C6 | PIX-105 10% Fe | Methanol 10% | Stable | Stable | Stable |
| C7 | PIX-105 10% Fe | Methanol 25% | Stable | Stable | Stable |
| C8 | PIX-105 10% Fe | Methanol 50% | Stable | Stable | Stable |
| C9 | PIX-332 12.5% Fe | Methanol 0.5% | Stable | Stable | Stable |
| C10 | PIX-332 12.5% Fe | Methanol 10% | Stable | Stable | Stable |
| C11 | PIX-332 12.5% Fe | Methanol 25% | Stable | Stable | Stable |
| C12 | PIX-332 12.5% Fe | Methanol 50% | Stable | Stable | Stable |

TABLE 5-continued

| Sample | Coagulant | Carbon source | Instant RT | 1 month RT | 3 months RT |
|---|---|---|---|---|---|
| C13 | PIX-105 4% Fe | Ethanol 0.5% | Stable | Stable | Stable |
| C14 | PIX-105 4% Fe | Ethanol 10% | Stable | Stable | Stable |
| C15 | PIX-105 4% Fe | Ethanol 25% | Stable | Stable | Stable |
| C16 | PIX-105 4% Fe | Ethanol 50% | Stable | Stable | Stable |
| C17 | PIX-105 10% Fe | Ethanol 0.5% | Stable | Stable | Stable |
| C18 | PIX-105 10% Fe | Ethanol 10% | Stable | Stable | Stable |
| C19 | PIX-105 10% Fe | Ethanol 25% | Stable | Stable | Stable |
| C20 | PIX-105 10% Fe | Ethanol 50% | Stable | Stable | Stable |
| C21 | PIX-332 12.5% Fe | Ethanol 0.5% | Stable | Stable | Stable |
| C22 | PIX-332 12.5% Fe | Ethanol 10% | Stable | Stable | Stable |
| C23 | PIX-332 12.5% Fe | Ethanol 25% | Stable | Stable | Stable |
| C24 | PIX-332 12.5% Fe | Ethanol 50% | Stable | Stable | Stable |
| C25 | PIX-105 4% Fe | Glycol 0.5% | Stable | Stable | Stable |
| C26 | PIX-105 4% Fe | Glycol 10% | Stable | Stable | Stable |
| C27 | PIX-105 4% Fe | Glycol 25% | Stable | Stable | Stable |
| C28 | PIX-105 4% Fe | Glycol 50% | Stable | Stable | Stable |
| C29 | PIX-105 10% Fe | Glycol 0.5% | Stable | Stable | Stable |
| C30 | PIX-105 10% Fe | Glycol 10% | Stable | Stable | Stable |
| C31 | PIX-105 10% Fe | Glycol 25% | Stable | Stable | Stable |
| C32 | PIX-105 10% Fe | Glycol 50% | Stable | Stable | Stable |
| C33 | PIX-332 12.5% Fe | Glycol 0.5% | Stable | Stable | Stable |
| C34 | PIX-332 12.5% Fe | Glycol 10% | Stable | Stable | Stable |
| C35 | PIX-332 12.5% Fe | Glycol 25% | Stable | Stable | Stable |
| C36 | PIX-332 12.5% Fe | Glycol 50% | Stable | Stable | Stable |

The same results were obtained when using methanol and a different coagulant (PIX-111). The stability was kept even if the amount of initial iron was increased to 13.8%

Stability testing was also carried out in the room temperature for 1 month using different aluminium containing coagulants and different carbon sources to provide the blend. The aluminium compounds were polyaluminium chloride, and aluminium sulphate. The amounts of aluminium in the coagulant materials used are in the table disclosed as wt % before the addition of the carbon source to prepare the blend. The carbon source amount disclosed in the table is in wt % of the blend. Stabilities of these blends are collected in the table 6. All blends with below 50% carbon source and up to 9.2% initial aluminium content are stable in room temperature.

TABLE 6

| Sample | Coagulant | Carbon source | Instant RT | 1 month RT |
|---|---|---|---|---|
| D1 | PAX-XL100 3% Al | Methanol 0.5% | Stable | Stable |
| D2 | PAX-XL100 3% Al | Methanol 10% | Stable | Stable |
| D3 | PAX-XL100 3% Al | Methanol 25% | Stable | Stable |
| D4 | PAX-XL100 3% Al | Methanol 50% | Stable | Stable |
| D5 | PAX-XL100 5% Al | Methanol 0.5% | Stable | Stable |
| D6 | PAX-XL100 5% Al | Methanol 10% | Stable | Stable |
| D7 | PAX-XL100 5% Al | Methanol 25% | Stable | Stable |
| D8 | PAX-XL100 5% Al | Methanol 50% | Stable | Stable |
| D9 | PAX-XL100 9.2% Al | Methanol 0.5% | Stable | Stable |
| D10 | PAX-XL100 9.2% Al | Methanol 10% | Stable | Stable |
| D11 | PAX-XL100 9.2% Al | Methanol 25% | Stable | Stable |
| D12 | PAX-XL100 9.2% Al | Methanol 50% | Stable | Cloudy |
| D13 | PAX-XL100 3% Al | Ethanol 0.5% | Stable | Stable |
| D14 | PAX-XL100 3% Al | Ethanol 10% | Stable | Stable |
| D15 | PAX-XL100 3% Al | Ethanol 25% | Stable | Stable |
| D16 | PAX-XL100 3% Al | Ethanol 50% | Stable | Stable |
| D17 | PAX-XL100 3% Al | Ethanol 0.5% | Stable | Stable |
| D18 | PAX-XL100 5% Al | Ethanol 10% | Stable | Stable |
| D19 | PAX-XL100 5% Al | Ethanol 25% | Stable | Stable |
| D20 | PAX-XL100 5% Al | Ethanol 50% | Stable | Stable |
| D21 | PAX-XL100 5% Al | Ethanol 0.5% | Stable | Stable |
| D22 | PAX-XL100 9.2% Al | Ethanol 10% | Stable | Stable |
| D23 | PAX-XL100 9.2% Al | Ethanol 25% | Stable | Stable |
| D24 | PAX-XL100 9.2% Al | Ethanol 50% | Stable | Stable |
| D25 | ALS 2% Al | Methanol 0.5% | Stable | Stable |
| D26 | ALS 2% Al | Methanol 10% | Stable | Stable |
| D27 | ALS 2% Al | Methanol 25% | Stable | Stable |
| D28 | ALS 2% Al | Methanol 50% | Stable | Cloudy |
| D29 | ALS 3% Al | Methanol 0.5% | Stable | Stable |
| D30 | ALS 3% Al | Methanol 10% | Stable | Stable |
| D31 | ALS 3% Al | Methanol 25% | Stable | Stable |
| D32 | ALS 3% Al | Methanol 50% | Stable | Unstable |
| D33 | ALS 4% Al | Methanol 0.5% | Stable | Stable |
| D34 | ALS 4% Al | Methanol 10% | Stable | Stable |
| D35 | ALS 4% Al | Methanol 25% | Stable | Stable |
| D36 | ALS 4% Al | Methanol 50% | Stable | Unstable |

From the above it is apparent that the blends are stable, at least until a very high amount of certain carbon sources are used.

The invention claimed is:

1. A liquid coagulant composition comprising a coagulant and a carbon source compound, wherein the coagulant is selected from the group iron and aluminium salts, or any combination thereof, wherein the iron salt is selected from ferric sulphate, ferric chloride or a combination thereof, the aluminium salt is selected from polyaluminium chloride(s), polyaluminium sulphate(s), aluminium sulphate, or a combination thereof, the carbon source compound is selected from any one of alcohols, organic acids, sugars, molasses and acetates, and any combination thereof, and the carbon source compound is present in said composition in an amount of 0.5-50 wt %.

2. The composition according to claim 1, wherein the aluminium salt is selected from polyaluminium chloride(s) and/or aluminium sulphate.

3. The composition according to claim 1, wherein the carbon source compound is selected from any one of methanol, ethanol, glycol, formic acid, acetic acid, propionic acid glucose, fructose, glyceraldehyde, saccharose, lactose and maltose, and any combination thereof.

4. The composition according to claim 1, wherein the carbon source compound is present in said composition in an amount of 5-50 wt %.

5. A method of treating wastewater including providing the liquid coagulant composition according to claim 1, to wastewater before, during and/or after a biological treatment step.

6. The method according to claim 5, wherein the liquid coagulant composition is provided to the wastewater before and/or at a primary settling step; added before and/or at a biological treatment step as a secondary treatment step; or before and/or at a tertiary treatment step; and any combination thereof.

7. The method according to claim 5, wherein the liquid coagulant composition is added at non-aerated zone.

8. The method according to claim 5, wherein the liquid coagulant composition reacts with the wastewater in a denitrification step.

9. The method according to claim 5, wherein a portion of the wastewater obtained from the biological treatment step is returned to a denitrification step of said biological treatment step.

10. Method of using the liquid coagulant composition according to claim 1, in a wastewater treatment step by adding the liquid coagulant composition to wastewater.

11. Method according to claim 10, wherein the liquid coagulant composition is added in a primary settling step, a secondary treatment step and a tertiary treatment step of a wastewater treatment plant.

12. Method according to claim 10, wherein the liquid coagulant composition is used for water soluble phosphorus and total nitrogen removal from wastewater.

13. The composition according to claim 1, wherein the carbon source compound is selected from any one of alcohols having 1-5 carbon atoms, fatty acids having 1-5 carbon atoms, acetates having 2-6 carbon atoms monosaccharides, disaccharides, trisaccharides, or a combination thereof.

14. The composition according to claim 1, wherein the carbon source compound comprises glycerol.

15. The composition according to claim 1, wherein the carbon source compound is present in said composition in an amount of 5-20 wt %.

* * * * *